United States Patent
Edwards et al.

(10) Patent No.: US 6,710,158 B2
(45) Date of Patent: Mar. 23, 2004

(54) METHODS FOR MAKING POLYESTER BOTTLE RESINS HAVING REDUCED FRICTIONAL PROPERTIES

(75) Inventors: Walter Lee Edwards, Harrisburg, NC (US); Robert Joseph Schiavone, Matthews, NC (US); Carl Steven Nichols, Waxhaw, NC (US); Tony Clifford Moore, Charlotte, NC (US)

(73) Assignee: Wellman, Inc., Shrewsbury, NJ (US)

( * ) Notice: Subject to any disclaimer, the term of this patent is extended or adjusted under 35 U.S.C. 154(b) by 0 days.

(21) Appl. No.: 10/177,932

(22) Filed: Jun. 21, 2002

(65) Prior Publication Data

US 2002/0156158 A1 Oct. 24, 2002

Related U.S. Application Data

(62) Division of application No. 09/738,619, filed on Dec. 15, 2000, now Pat. No. 6,500,890.

(51) Int. Cl.$^7$ .............................................. C08G 63/78
(52) U.S. Cl. ................ 528/275; 528/308.3; 528/308.8; 528/488; 524/425; 524/451
(58) Field of Search .............................. 528/275, 308.3, 528/308.8, 488; 524/425, 451

(56) References Cited

U.S. PATENT DOCUMENTS

| | | |
|---|---|---|
| 3,368,995 A | 2/1968 | Furukswa et al. |
| 3,516,957 A | 6/1970 | Gray et al. |
| 3,624,024 A | 11/1971 | Caldwell et al. |
| 3,859,245 A | 1/1975 | Stieler et al. |
| 3,884,870 A * | 5/1975 | Dodson et al. |
| 3,968,183 A | 7/1976 | Hayashi et al. |
| 4,132,707 A | 1/1979 | Borman |
| 4,224,264 A | 9/1980 | Ort et al. |
| 4,312,960 A | 1/1982 | Ort et al. |
| 4,365,031 A | 12/1982 | Massey et al. |
| 4,368,284 A | 1/1983 | Tawada et al. |
| 4,374,949 A | 2/1983 | Massey et al. |
| 4,412,888 A | 11/1983 | Fremont |
| 4,414,352 A | 11/1983 | Cohen et al. |
| 4,430,468 A | 2/1984 | Schumacher |
| 4,434,258 A | 2/1984 | Schumacher et al. |
| 4,443,573 A | 4/1984 | Wells et al. |
| 4,450,200 A | 5/1984 | Iwato et al. |
| 4,451,606 A | 5/1984 | Campbell |
| 4,460,731 A | 7/1984 | Kochanowski et al. |
| 4,467,051 A | 8/1984 | Finax et al. |
| 4,492,782 A | 1/1985 | Williams et al. |
| 4,504,608 A | 3/1985 | Kishida et al. |
| 4,536,531 A | 8/1985 | Ogawa et al. |
| 4,555,533 A | 11/1985 | Ambros et al. |
| 4,595,715 A | 6/1986 | Kuze et al. |
| 4,607,075 A | 8/1986 | Baum et al. |
| 4,643,921 A | 2/1987 | Terabe et al. |
| 4,643,925 A | 2/1987 | Smith et al. |
| 4,654,399 A | 3/1987 | Callander et al. |
| 4,677,150 A | 6/1987 | Chako et al. |
| 4,699,942 A | 10/1987 | Weaver et al. |
| 4,713,407 A | 12/1987 | Bailey et al. |
| 4,778,858 A | 10/1988 | Ginnings |
| 4,786,673 A | 11/1988 | Morival et al. |
| 4,795,771 A | 1/1989 | Yoshihara et al. |
| 4,820,347 A | 4/1989 | Weber |
| 4,898,897 A | 2/1990 | Kiyohara et al. |
| 4,908,428 A | 3/1990 | Bastioli et al. |
| 4,927,874 A | 5/1990 | Weber |
| 4,929,482 A | 5/1990 | Moritani et al. |
| 4,931,493 A | 6/1990 | Weber |
| 4,948,665 A | 8/1990 | Rosen et al. |
| 4,970,256 A | 11/1990 | Inoue et al. |
| 4,981,896 A | 1/1991 | Okada et al. |
| 4,983,660 A | 1/1991 | Yoshida et al. |
| 4,994,518 A | 2/1991 | Morin et al. |
| 5,000,871 A | 3/1991 | Minayoshi et al. |
| 5,008,230 A | 4/1991 | Nichols |
| 5,039,717 A | 8/1991 | Kawakami et al. |
| 5,082,890 A | 1/1992 | Chou et al. |
| 5,089,553 A | 2/1992 | Umeda et al. |
| 5,114,995 A | 5/1992 | Golder et al. |
| 5,114,996 A | 5/1992 | Golder et al. |
| 5,114,997 A | 5/1992 | Golder et al. |
| 5,114,998 A | 5/1992 | Golder et al. |
| 5,147,920 A | 9/1992 | Dekkers et al. |
| 5,155,145 A | 10/1992 | Foster et al. |
| 5,189,091 A | 2/1993 | Laughner |
| 5,240,980 A | 8/1993 | Danielson et al. |
| 5,258,161 A | 11/1993 | Ealer |
| 5,262,471 A | 11/1993 | Akao |

(List continued on next page.)

FOREIGN PATENT DOCUMENTS

| | | |
|---|---|---|
| EP | 0060178 | 9/1982 |
| EP | 0 139 203 A2 | 5/1985 |
| EP | 0 169 085 A1 | 1/1986 |
| EP | 0 0258 636 A2 | 3/1988 |
| EP | 0 272 417 A2 | 6/1988 |
| EP | 0 455 370 A2 | 11/1991 |
| EP | 0 459 317 A1 | 12/1991 |
| EP | 0 703 263 A1 | 3/1996 |
| EP | 0 718 341 A2 | 6/1996 |

(List continued on next page.)

OTHER PUBLICATIONS

W.R. Sorenson & T.W. Campbell, "Preparative Methods of Polymer chemistry", Interscience Publishers, New York, 1968, pp. 130–154.

Encyclopedia of Polymer Science and Engineering, 2nd Ed., H.F. Mark et al., (John Wiley & Sons, New York 1985) vol. 12, pp. 259–274.

*Primary Examiner*—Tae H. Yoon
(74) *Attorney, Agent, or Firm*—Summa & Allan, P.A.

(57) ABSTRACT

The invention is a polyester resin that includes between about 20 and 200 ppm of an inert particulate additive, preferably selected from the group consisting of surface-modified talc and surface-modified calcium carbonate. The invention is also a method of making the polyester resin, which is capable of being formed into low-haze, high-clarity bottles possessing reduced coefficient of friction.

52 Claims, 3 Drawing Sheets

U.S. PATENT DOCUMENTS

| | | | |
|---|---|---|---|
| 5,288,784 A | 2/1994 | Minayoshi | |
| 5,300,558 A | 4/1994 | Kurisu et al. | |
| 5,308,892 A | 5/1994 | Zickler et al. | |
| 5,316,714 A | 5/1994 | Yoneda et al. | |
| 5,322,663 A | 6/1994 | Lai et al. | |
| 5,326,806 A | 7/1994 | Yokoshima et al. | |
| 5,360,829 A | 11/1994 | Kawabe et al. | |
| 5,369,154 A | 11/1994 | Laughner | |
| 5,373,046 A | 12/1994 | Okamura et al. | |
| 5,376,702 A | 12/1994 | Stibal et al. | |
| 5,391,607 A | 2/1995 | Fujii et al. | |
| 5,399,603 A | 3/1995 | Sloan et al. | |
| 5,449,722 A | 9/1995 | Nishida et al. | |
| 5,461,092 A | 10/1995 | Laughner | |
| 5,489,640 A | 2/1996 | Riding | |
| 5,496,880 A | 3/1996 | Heuseveldt et al. | |
| 5,504,130 A | 4/1996 | Riding | |
| 5,536,763 A | 7/1996 | Foran | |
| 5,571,866 A | 11/1996 | Nishida et al. | |
| 5,574,078 A | 11/1996 | Elwakil | |
| 5,635,548 A | 6/1997 | Kittle et al. | |
| 5,654,347 A | 8/1997 | Khemani et al. | |
| 5,712,362 A | 1/1998 | Scholl et al. | |
| 5,830,544 A | 11/1998 | Kerscher et al. | |
| 5,831,544 A | 11/1998 | Park | |
| 5,834,089 A | 11/1998 | Jones et al. | |
| 5,840,419 A | 11/1998 | Alder | |
| 5,874,517 A | 2/1999 | Huang et al. | |
| 5,898,058 A | 4/1999 | Nichols et al. | |
| 5,908,890 A | 6/1999 | Cornett | |
| 5,919,872 A | 7/1999 | Tung et al. | |
| 5,922,828 A | 7/1999 | Schiraldi | |
| 5,939,516 A | 8/1999 | Greaves et al. | |
| 5,945,460 A | 8/1999 | Ekart et al. | |
| 5,976,450 A | 11/1999 | Mreijen | |
| 6,020,414 A | 2/2000 | Nelsen et al. | |
| 6,048,922 A | 4/2000 | Brink et al. | |
| 6,099,789 A | 8/2000 | Sumi | |
| 6,110,405 A | 8/2000 | King et al. | |
| 6,121,351 A | 9/2000 | Weaver et al. | |
| 6,147,148 A | 11/2000 | Tanaka et al. | |
| 6,150,454 A | 11/2000 | Wu et al. | |
| 6,201,041 B1 | 3/2001 | Pasbrig et al. | |
| 6,277,899 B1 | 8/2001 | Bastioli et al. | |
| 6,281,283 B1 | 8/2001 | Heitz et al. | |
| 6,284,866 B1 | 9/2001 | Schiavone | |
| 6,306,492 B1 | 10/2001 | Yamada et al. | |
| 6,323,271 B1 | 11/2001 | Caldwell et al. | |
| 6,359,052 B1 | 3/2002 | Trexler, Jr. et al. | |
| 6,362,269 B1 | 3/2002 | Ishihata et al. | |
| 6,423,764 B1 | 7/2002 | Zhao et al. | |
| 6,503,616 B1 * | 1/2003 | Jalan | |
| 6,559,271 B2 | 5/2003 | Schaaf et al. | |
| 6,569,991 B2 | 5/2003 | Nichols et al. | |
| 6,573,359 B2 | 6/2003 | Nichols et al. | |
| 2002/0077443 A1 | 6/2002 | Nichols et al. | |
| 2002/0077445 A1 | 6/2002 | Nichols et al. | |
| 2002/0077449 A1 | 6/2002 | Nichols et al. | |
| 2002/0091226 A1 | 7/2002 | Nichols et al. | |
| 2003/0039783 A1 | 2/2003 | Stafford et al. | |
| 2003/0055207 A1 | 3/2003 | Xu et al. | |

FOREIGN PATENT DOCUMENTS

| | | |
|---|---|---|
| GB | 1104089 A1 | 8/1966 |
| GB | 1100175 | 1/1968 |
| IE | 52386 | 10/1987 |
| JP | 45-19789 | 7/1970 |
| JP | 61-031429 | 2/1986 |
| JP | 61-250034 | 11/1986 |
| JP | 2-147657 | 6/1990 |
| JP | 2307117 | 12/1990 |
| JP | 03039348 A | 2/1991 |
| JP | 4-180957 | 6/1992 |
| JP | 4180967 | 6/1992 |
| JP | 4-183716 | 6/1992 |
| JP | 4183718 | 8/1992 |
| JP | 5104621 | 4/1993 |
| JP | 06 073205 A | 3/1994 |
| JP | 6065478 | 8/1994 |
| JP | 7238211 | 9/1995 |
| JP | 08120066 A | 5/1996 |
| JP | 9272191 | 10/1997 |
| JP | 11323126 A | 11/1999 |
| JP | 319365 A | 11/2000 |
| WO | WO 99/41297 A | 8/1999 |
| WO | WO 00/12793 A | 3/2000 |
| WO | WO 00/52094 A1 | 8/2000 |
| WO | WO 00/66659 A | 11/2000 |
| WO | WO 01/34703 (ABS) A1 | 5/2001 |
| WO | WO 02/16464 A2 | 2/2002 |
| WO | WO 02/079309 A1 | 10/2002 |

* cited by examiner

Response of Bottle Haze and Coefficient of Friction With Increasing Concentration of Inert Particulate

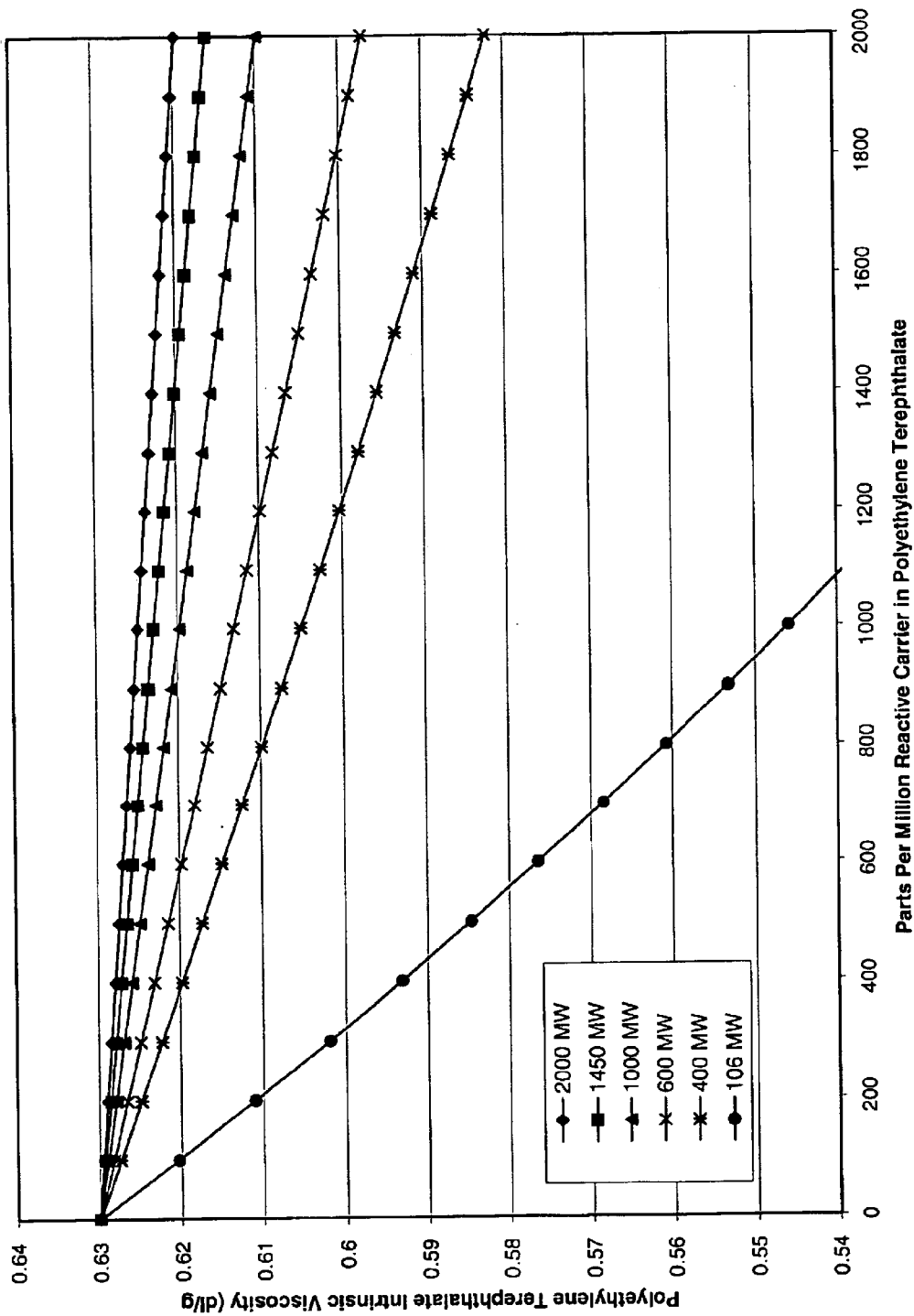
FIGURE 2 (Impact of Reactive Carrier Molecular Weight upon Intrinsic Viscosity)

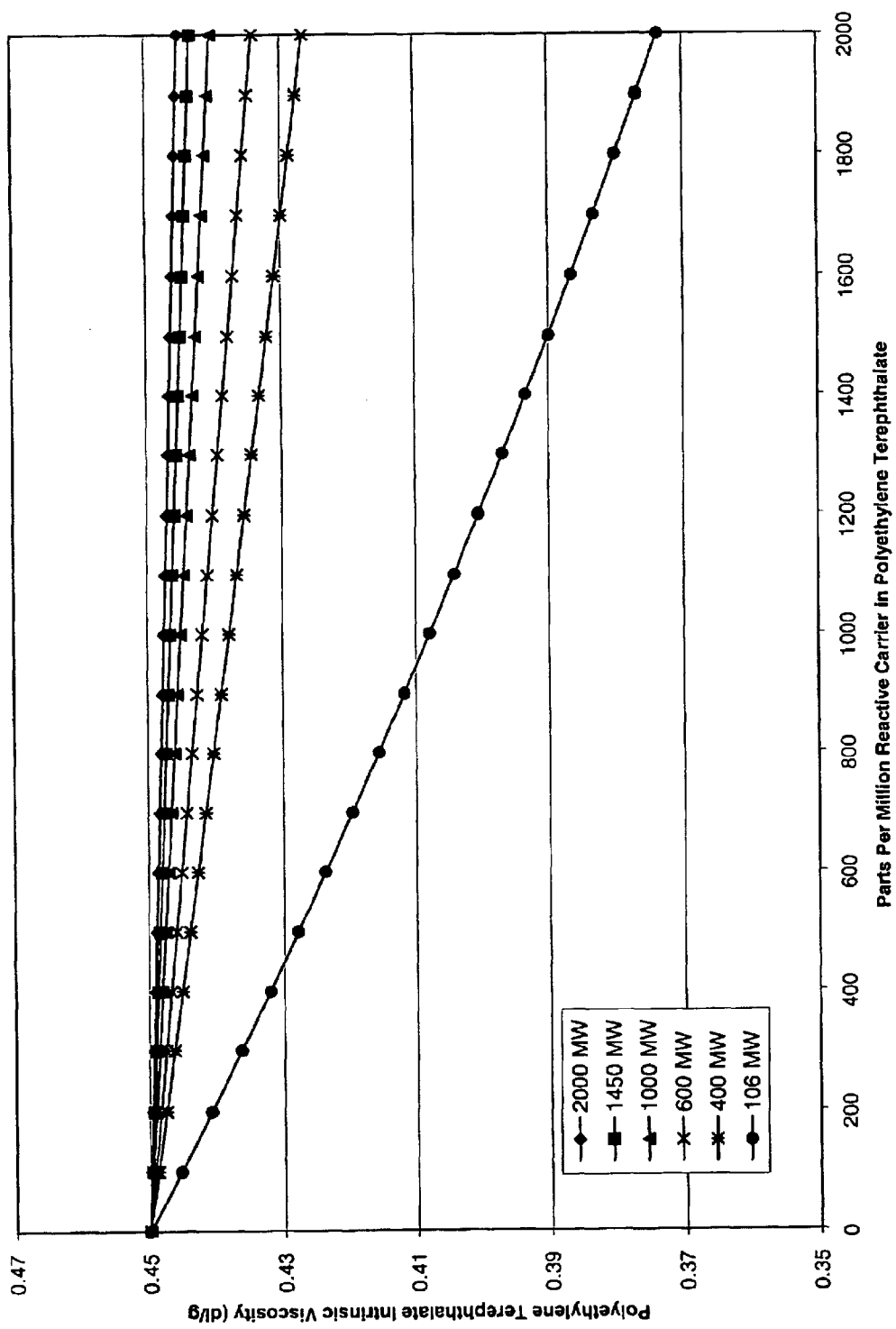

METHODS FOR MAKING POLYESTER BOTTLE RESINS HAVING REDUCED FRICTIONAL PROPERTIES

CROSS-REFERENCE TO RELATED APPLICATION

This application is a division of U.S. Ser. No. 09/738,619, for Polyester Bottle Resins Having Reduced Frictional Properties and Methods for Making the Same, filed Dec. 15, 2000, now U.S. Pat. No. 6,500,890, This application is also related to application Ser. No. 09/738,150, for Methods of Post-Polymerization Injection in Continuous Polyethylene Terephthalate Production, also filed Dec. 15, 2000, now U.S. Pat. No. 6,599,596. Each of these applications is commonly assigned with this application and is hereby incorporated entirely herein by reference.

FIELD OF THE INVENTION

The invention relates to a polyester resin that includes small amounts of an inert particulate additive, which reduces the coefficient of friction in bottles formed from the polyester resin while maintaining bottle clarity.

BACKGROUND OF THE INVENTION

Polyester resins, especially polyethylene terephthalate (PET) and its copolyesters, are widely used to produce rigid packaging, such as two-liter soft drink containers. Polyester packages produced by stretch-blow molding possess high strength and shatter resistance, and have excellent gas barrier and organoleptic properties as well. Consequently, such plastics have virtually replaced glass in packaging numerous consumer products (e.g., carbonated soft drinks, fruit juices, and peanut butter).

In conventional techniques of making bottle resin, modified polyethylene terephthalate is polymerized in the melt phase to an intrinsic viscosity of about 0.6 deciliters per gram (dl/g), whereupon it is polymerized in the solid phase to achieve an intrinsic viscosity that better promotes bottle formation. Before 1965, the only feasible method of producing polyethylene terephthalate polyester was to use dimethyl terephthalate (DMT). In this technique, dimethyl terephthalate and ethylene glycol are reacted in a catalyzed ester interchange reaction to form bis(2-hydroxyethyl) terephthalate monomers and oligomers, as well as a methanol byproduct that is continuously removed. These bis(2-hydroxyethyl)terephthalate monomers and oligomers are then catalytically polymerized via polycondensation to produce polyethylene terephthalate polymers.

Purer forms of terephthalic acid (TA) are now increasingly available. Consequently, terephthalic acid has become an acceptable, if not preferred, alternative to dimethyl terephthalate as a starting material for the production of polyethylene terephthalate. In this alternative technique, terephthalic acid and ethylene glycol react in a generally uncatalyzed esterification reaction to yield low molecular weight monomers and oligomers, as well as a water byproduct that is continuously removed. As with the dimethyl terephthalate technique, the monomers and oligomers are subsequently catalytically polymerized by polycondensation to form polyethylene terephthalate polyester. The resulting polyethylene terephthalate polymer is substantially identical to the polyethylene terephthalate polymer resulting from dimethyl terephthalate, albeit with some end group differences.

Polyethylene terephthalate polyester may be produced in a batch process, where the product of the ester interchange or esterification reaction is formed in one vessel and then transferred to a second vessel for polymerization. Generally, the second vessel is agitated and the polymerization reaction is continued until the power used by the agitator reaches a level indicating that the polyester melt has achieved the desired intrinsic viscosity and, thus, the desired molecular weight. More commercially practicable, however, is to carry out the esterification or ester interchange reactions, and then the polymerization reaction as a continuous process. The continuous production of polyethylene terephthalate results in greater throughput, and so is more typical in large-scale manufacturing facilities.

When the polymerization process is complete, the resulting polymer melt is typically extruded and pelletized for convenient storage and transportation. Thereafter, the polyethylene terephthalate may be molded into preforms and bottles.

As will be understood by those having ordinary skill in the art, polyethylene terephthalate is typically converted into a container via a two-step process. First, an amorphous bottle preform is produced from bottle resin by melting the resin in an extruder and injection molding the molten polyester into a preform. Such a preform usually has an outside surface area that is at least an order of magnitude smaller than the outside surface of the final container. The preform is reheated to an orientation temperature that is typically 30° C. above the glass transition temperature. The reheated preform is then placed into a bottle mold and, by stretching and inflating with high-pressure air, formed into a bottle. Those of ordinary skill in the art will understand that any defect in the preform is typically transferred to the bottle. Accordingly, the quality of the bottle resin used to form injection-molded preforms is critical to achieving commercially acceptable bottles.

Polyethylene terephthalate bottles, especially straight-walled two-liter soft drink bottles, often possess high coefficients of friction (COF). This is a significant problem in the bottling industry as excessive friction between adjacent bottles prevents such bottles from easily and efficiently sliding past one another as they are depalletized. To improve depalletizing, bottlers conventionally resort to water misting and line lubrication on a filling line.

Therefore, there is a need for a polyester bottle that possesses reduced coefficient of friction while retaining bottle clarity.

OBJECT AND SUMMARY OF THE INVENTION

Accordingly, it is an object of the present invention to provide a high-clarity polyester bottle including a surface-modified talc or surface-modified calcium carbonate in concentrations that permit the bottle to possess reduced coefficient of friction.

It is a further object of the present invention to provide a method for making polyethylene terephthalate preforms and bottles possessing reduced coefficients of friction.

It is a further object of the present invention to provide a polyester resin that is capable of being formed into high-clarity bottles possessing reduced coefficient of friction.

It is a further object of the present invention to provide a method for making polyethylene terephthalate resin that can be formed into high-clarity bottles possessing reduced coefficient of friction.

The foregoing, as well as other objectives and advantages of the invention and the manner in which the same are accomplished, is further specified within the following detailed description and its accompanying drawings.

BRIEF DESCRIPTION OF THE DRAWINGS

FIGS. 2 and 3 illustrate the theoretical loss of intrinsic viscosity of polyethylene terephthalate as a function of the concentration of a reactive (additive) carrier at various molecular weights.

DETAILED DESCRIPTION

Figure 1:
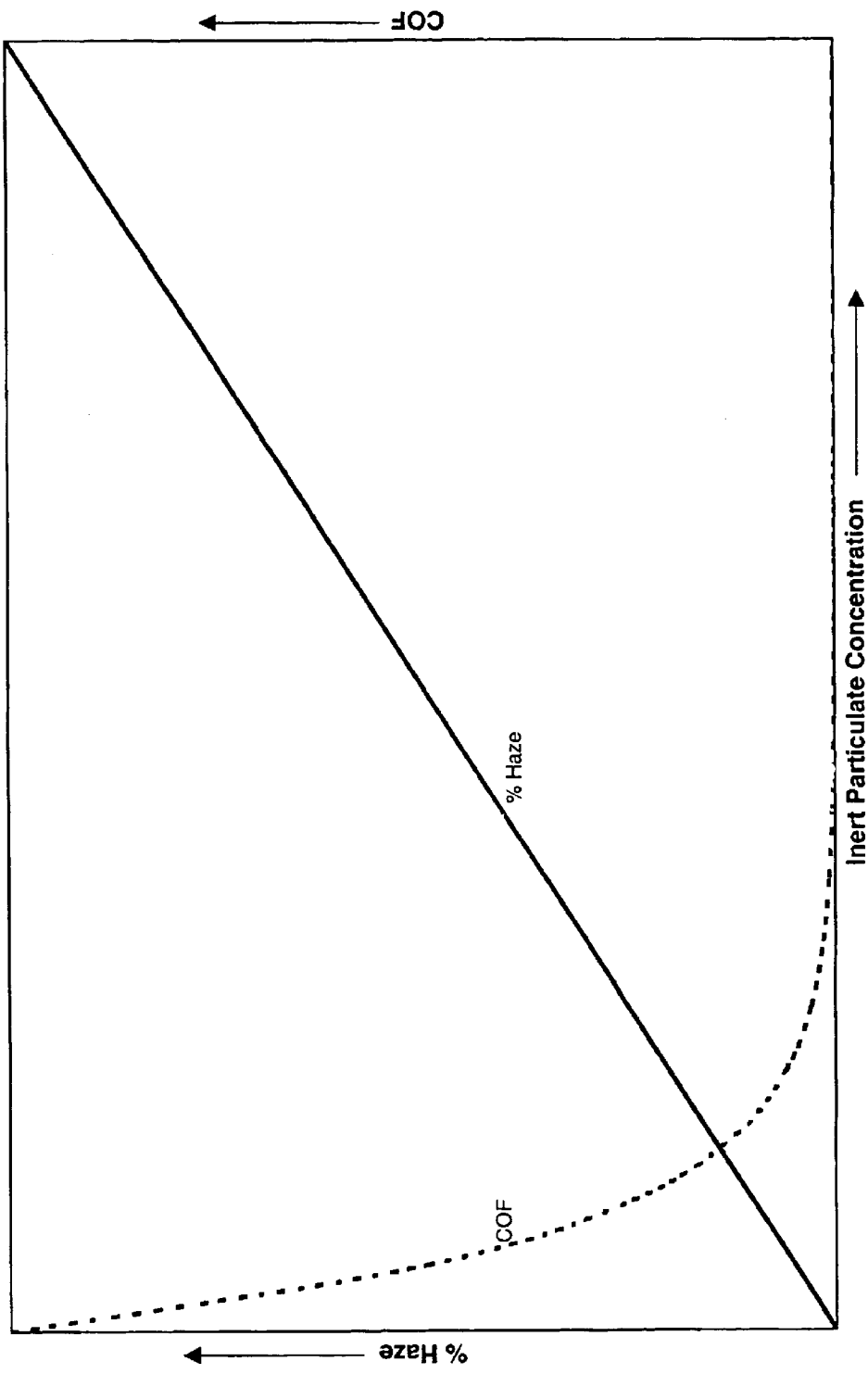
FIG. 1 illustrates the qualitative effect on bottle sidewall haze and friction as a function of increasing concentration of the reduced COF additive.

In one aspect, the invention is a polyester resin that is capable of being formed into low-haze, high-clarity bottles possessing reduced coefficient of friction. The bottle resin is characterized by the inclusion of between about 20 and 200 ppm of an inert particulate additive, preferably either talc (i.e., a natural hydrous magnesium silicate of representative formula $3MgO \cdot 4SiO_2 \cdot H_2O$) or precipitated calcium carbonate, having an average particle size of less than about ten microns, more preferably less than two microns. The inert particulate additive, which is preferably surface-treated, is present in low concentrations to ensure that bottles formed from the polyester bottle resin possess low haziness. Such improved frictional characteristics reduce, and can eliminate, the need to apply, during filling operation, external lubricants to the surfaces of containers formed from the present polyester resin.

Preferably, the polyester resin includes between about 40 and 150 ppm of the inert particulate additive, more preferably between about 40 and 100 ppm of the inert particulate additive, and most preferably between about 60 and 100 ppm of the inert particulate additive.

In another aspect, the invention is a method for making a polyester resin that can be formed into high-clarity bottles possessing reduced coefficient of friction. The method generally includes reacting a terephthalate component and a diol component to form polyethylene terephthalate precursors, e.g., bis(2-hydroxyethyl) terephthalate, which are then polymerized via melt phase polycondensation to form polymers of polyethylene terephthalate of a desired molecular weight. During polycondensation, which is usually enhanced by catalysts, ethylene glycol is continuously removed to create favorable reaction kinetics. The method is characterized by the introduction of between about 20 and 200 ppm of an inert particulate additive-more preferably talc or calcium carbonate in the aforementioned concentration ranges-that is capable of reducing the coefficient of friction in bottles formed from the polyethylene terephthalate polymers. As noted, the friction-reducing additive has an average particle size of less than about ten microns and is preferably either surface-modified talc or surface-modified calcium carbonate.

Without being bound to a particular theory, it is believed that the introduction of fillers can create discontinuous phases within the polyethylene terephthalate resin. During stretch-blow molding, such discontinuities lead to the formation of microvoids around the filler particles. This causes bottle haze because of differences in refractive index between the microvoid regions and the polyethylene terephthalate matrix. The microvoids are apparently caused by an inherent incompatibility of the filler particles with the polyethylene terephthalate matrix.

According to the present invention, to improve compatibility between the polyethylene terephthalate polymers and the inert particulate additive, the inert particulate additive is preferably treated with a coupling agent before its addition to polyethylene terephthalate polymers. This has been found to significantly reduce bottle haze while reducing bottle COF. Without coupling agent treatment, the polyethylene terephthalate polymers resist wetting of the inert particles. Thus, all things being equal, surface treatment reduces polyester bottle haze.

Accordingly, the inert particulate additive is preferably surface-modified talc or surface-modified calcium carbonate. In particular, talc is preferably surface treated using silanes, especially organosilanes such as 3-aminopropyl trimethoxy silane and 3-aminopropyl triethoxy silane, at a loading of between about 0.5 and one weight percent. Calcium carbonate is preferably surface treated using stearic acid at a loading of between about one and two weight percent. Treatment with these coupling agents (e.g., organosilane and stearic acid) facilitates compatibility between the inert particles and the polyethylene terephthalate polymer by introducing covalent chemical bonding between the particle surface and the polyethylene terephthalate polymer, or by introducing a hydrophobic moiety that is compatible with the polyethylene terephthalate to facilitate better polymer wetting of the particle.

The inclusion of an inert particulate additive in the polyethylene terephthalate resin reduces bottle friction, but also increases bottle haze. FIG. 1 depicts the trade-off between reduced friction and haze. In brief, concentrations of talc or calcium carbonate greater than about 200 ppm (and in some instances even 100 ppm) will result in unacceptable hazy bottles, and concentrations of talc or calcium carbonate much less than about 20 ppm will not noticeably reduce bottle COF. As described previously, the polyester resin preferably includes between about 40 and 150 ppm of the inert particulate additive and most preferably between about 60 and 100 ppm of the inert particulate additive.

The efficacy of the present invention is demonstrated by testing that shows the addition of 100 ppm of surface-treated talc reduces coefficient of friction by about 90 percent, as measured using ASTM Test method D 1894.

Note that at any given weight fraction of inert particulate additive, increasing particle size will exacerbate haziness with no concomitant reduction in friction. An average particle size of much more than ten microns generally causes unacceptable bottle haze. As will be understood by those familiar with this art, particle size is typically measured by techniques based on light scattering. Particle sizes and distributions are often characterized using a Hegman Fineness number determined from ASTM D1210-79.

As used herein, the term "diol component" refers primarily to ethylene glycol, although other diols (e.g., polyethylene glycol) may be used as well. It will be understood by those of ordinary skill in the art that the diol component usually forms the majority of terminal ends of the polymer chains and so is present in the composition in slightly greater fractions. For example, the molar ratio of the terephthalate component and the diol component is typically between about 1.0:1.0 and 1.0:1.6.

As used herein, the term "terephthalate component" refers to diacids and diesters that can be used to prepare polyethylene terephthalate. In particular, the terephthalate component mostly includes terephthalic acid and dimethyl terephthalate, but can include diacid and diester comonomers as well. In this regard, those having ordinary skill in the art will know that there are two conventional methods for forming polyethylene terephthalate. These methods are well known to those skilled in the art.

One method employs a direct esterification reaction using terephthalic acid and excess ethylene glycol. In this technique, the aforementioned step of reacting a terephthalate component and a diol component includes reacting terephthalic acid and ethylene glycol in a heated esterification reaction to form monomers and oligomers of terephthalic acid and ethylene glycol, as well as a water byproduct. To enable the esterification reaction to go essentially to completion, the water must be continuously removed as it is formed.

The other method involves a two-step ester exchange reaction and polymerization using dimethyl terephthalate and excess ethylene glycol. In this technique, the aforementioned step of reacting a terephthalate component and a diol component includes reacting dimethyl terephthalate and ethylene glycol in a heated ester exchange reaction to form monomers and oligomers of terephthalate and ethylene glycol, as well as methanol as a byproduct. To enable the ester exchange reaction to go essentially to completion, the methanol must be continuously removed as it is formed.

It will be understood by those having ordinary skill in the art that the polyethylene terephthalate herein described may be a modified polyethylene terephthalate to the extent the diol component can include other glycols besides ethylene glycol (e.g., diethylene glycol, 1,3-propanediol, 1,4-butanediol and 1,4-cyclohexane dimethanol), or the terephthalate component includes modifiers such as isophthalic acid, 2,6-naphthalene dicarboxylic acid, succinic acid, or one or more functional derivatives of terephthalic acid. In fact, most commercial polyethylene terephthalate polymers are modified polyethylene terephthalate polyesters.

An advantage of the present invention is that the inert particulate additives may be added to any polyester bottle resin formulation to reduce COF in bottles made therefrom. In this regard, bottle grade polyester resins will not be discussed herein in detail as such resins are well known in the art. For example, commonly-assigned, co-pending application Ser. No. 09/456,253, filed Dec. 7, 1999, for a Method of Preparing Modified Polyester Bottle Resins, now U.S. Pat. No. 6,284,866, which discusses several U.S. patents that disclose various modified polyethylene terephthalate resins. This application is hereby incorporated entirely herein by reference.

While the present application is directed to polyester resins, it is believed that non-polyester resins, such as high-density polyethylene (HDPE), low-density polyethylene (LDPE), linear low-density polyethylene (LLDPE), polyvinyl chloride (PVC), and polyvinyl dichloride (PVDC), which are typically used in films, show analogous frictional characteristics and thus benefit from the use of inert particulate additives to reduce COF.

In the present invention, the direct esterification reaction is preferred over the older, two-step ester exchange reaction. As noted, the direct esterification technique reacts terephthalic acid and ethylene glycol to form low molecular weight monomers, oligomers, and water.

For example, in a typical, exemplary process the continuous feed enters a direct esterification vessel that is operated at a temperature of between about 240° C. and 290° C. and at a pressure of between about 5 and 85 psia for between about one and five hours. The reaction, which is typically uncatalyzed, forms low molecular weight monomers, oligomers, and water. The water is removed as the esterification reaction proceeds to drive a favorable reaction equilibrium.

Thereafter, the low molecular weight monomers and oligomers are polymerized via polycondensation to form polyethylene terephthalate polyester. This polycondensation stage generally employs a series of two or more vessels and is operated at a temperature of between about 250° C. and 305° C. for between about one and four hours. The polycondensation reaction usually begins in a first vessel called the low polymerizer. The low polymerizer is operated at a pressure range of between about 0 and 70 torr. The monomers and oligomers polycondense to form polyethylene terephthalate and ethylene glycol.

The ethylene glycol is removed from the polymer melt using an applied vacuum to drive the reaction to completion. In this regard, the polymer melt is typically agitated to promote the escape of the ethylene glycol from the polymer melt and to assist the highly viscous polymer melt in moving through the polymerization vessel.

As the polymer melt is fed into successive vessels, the molecular weight and thus the intrinsic viscosity of the polymer melt increases. The temperature of each vessel is generally increased and the pressure decreased to allow greater polymerization in each successive vessel.

The final vessel, generally called the "high polymerizer," is operated at a pressure of between about 0 and 40 torr. Like the low polymerizer, each of the polymerization vessels is connected to a flash vessel and each is typically agitated to facilitate the removal of ethylene glycol. The residence time in the polymerization vessels and the feed rate of the ethylene glycol and terephthalic acid into the continuous process is determined in part based on the target molecular weight of the polyethylene terephthalate polyester. Because the molecular weight can be readily determined based on the intrinsic viscosity of the polymer melt, the intrinsic viscosity of the polymer melt is generally used to determine the feed rate of the reactants and the residence time within the polymerization vessels.

Note that in addition to the formation of polyethylene terephthalate polymers, side reactions occur that produce undesirable by-products. For example, the esterification of ethylene glycol forms diethylene glycol (DEG), which is incorporated into the polymer chain. As is known to those of skill in the art, diethylene glycol lowers the softening point of the polymer. Moreover, cyclic oligomers (e.g., trimer and tetramers of terephthalic acid and ethylene glycol) may occur in minor amounts. The continued removal of ethylene glycol as it forms in the polycondensation reaction will generally reduce the formation of these byproducts.

After the polymer melt exits the polycondensation stage, typically from the high polymerizer, it is generally filtered and extruded, preferably immediately after exiting the polycondensation stage. After extrusion, the polyethylene terephthalate is quenched, preferably by spraying with water, to solidify it. The solidified polyethylene terephthalate polyester is cut into chips or pellets for storage and handling purposes. As used herein, the term "pellets" is used generally to refer to chips, pellets, and the like.

As will be known to those of skill in the art, the pellets formed from the polyethylene terephthalate polymers may be subjected to crystallization followed by solid state polymerization (SSP) to increase the molecular weight of the polyethylene terephthalate resin. It should be noted that the method of the invention does not adversely affect the SSP rate and often will even increase the SSP rate. The polyester chips are then re-melted and re-extruded to form bottle preforms, which can thereafter be formed into polyester containers (e.g., beverage bottles). The levels of inert particulate additives (i.e., less than 200 ppm) do not detrimentally affect cycle times during injection molding operations.

Although the prior discussion assumes a continuous production process, it will be understood that the invention is not so limited. The teachings disclosed herein may be applied to semi-continuous processes and even batch processes.

The inert particulate additives herein disclosed can be introduced to the polyethylene terephthalate polymers as a powder, as a concentrate in polyethylene terephthalate, or as a concentrate in a liquid carrier. The preferred point of addition in the polyethylene terephthalate polymerization process is after completion of polycondensation (i.e., mixed with the molten polymer stream after the final polymerization vessel).

In one embodiment, the method introduces an essentially dry, inert particulate additive into the polyethylene terephthalate polymers during or after the polycondensation stage. Dry, inert particulate additive may be introduced via a split-stream method, such as that disclosed by U.S. Pat. No. 5,376,702 for a Process and Apparatus for the Direct and Continuous Modification of Polymer Melts. This patent discloses dividing a polymer melt stream into an unmodified stream and a branch stream that receives additives. In particular, a side stream takes a portion of the branch stream to an extruder, where additives are introduced. Unfortunately, this kind of technique is not only complicated, but also costly, requiring at least a screw extruder and additional melt piping to process additives. Consequently, such arrangements are inconvenient and even impractical where total additive concentrations are low (e.g., less than one weight percent).

Most preferably, the inert particulate additives are added after the melt polymerization is complete. Such late addition is desirable because esterification and polycondensation conditions can cause a calcium carbonate additive to dissolve in the polymer, which destroys its particulate nature. Consequently, calcium carbonate is preferably added to the polyethylene terephthalate polymer before extrusion and pelletization.

Similarly, high polycondensation temperatures can strip coupling agents (e.g., silane surface treatment) from talc. As talc is not susceptible to dissolution in the polymer, its addition is more adaptable than is the addition of calcium carbonate (i.e., talc itself can be added at any point during the polymerization).

Accordingly, in a preferred embodiment, the method introduces the inert particulate additive via a reactive carrier, rather than via an inert carrier or no carrier at all. The reactive carrier, which preferably has a molecular weight of less than about 10,000 g/mol may be introduced during polycondensation, or more preferably, after the polycondensation is complete. In either respect, the reactive carrier should be introduced to the polyethylene terephthalate polymers in quantities such that bulk polymer properties are not significantly affected.

Most preferably, the reactive carrier has a melting point that ensures that it is a liquid or slurry at near ambient temperatures. Near ambient temperatures not only simplify the unit operations (e.g., extruders, heaters, and piping), but also minimize degradation of the inert particulate additives. As used herein, the term "near ambient" includes temperatures between about 20° C. and 60° C.

As a general matter, the reactive carrier should make up no more than about one weight percent of the polyethylene terephthalate resin. Preferably, the reactive carrier is introduced to the polyethylene terephthalate polymers in quantities such that its concentration in the polymer resin is less than about 1000 ppm (i.e., 0.1 weight percent). Reducing the reactive carrier to quantities such that its concentration in the polymer resin is less than 500 ppm (i.e., 0.05 weight percent) will further reduce potential adverse effects to bulk polymer properties.

In general, reactive carriers having carboxyl, hydroxyl, or amine functional groups are favored. Preferred are polyols, especially polyester polyols and polyetherpolyols, having a molecular weight that is sufficiently high such that the polyol will not substantially reduce the intrinsic viscosity of the polyethylene terephthalate polymer, and a viscosity that facilitates pumping of the polyol. Polyethylene glycol is a preferred polyol. Other exemplary polyols include functional polyethers, such as polypropylene glycol that is prepared from propylene oxide, random and block copolymers of ethylene oxide and propylene oxide, and polytetramethylene glycol that is derived from the polymerization of tetrahydrofuran.

Alternatively, the reactive carrier may include dimer or trimer acids and anhydrides. In another embodiment, the reactive carrier may possess, in addition to or in place of terminal functional groups, internal functional groups (e.g., esters, amides, and anhydrides) that react with the polyethylene terephthalate polymers. In yet another embodiment, the reactive carrier may include non-functional esters, amides, or anhydrides that is capable of reacting into the polyethylene terephthalate polymers during solid state polymerization and that will not cause the polyethylene terephthalate polymers to suffer intrinsic viscosity loss during injection molding processes.

In view of the foregoing, a preferred embodiment of the invention includes reacting terephthalic acid and ethylene glycol in a heated esterification reaction to form monomers and oligomers of terephthalic acid and ethylene glycol, then polymerizing these monomers and oligomers via melt phase polycondensation to form polyethylene terephthalate polymers. Thereafter, between about 20 and 200 ppm of either surface-modified talc or surface-modified calcium carbonate is introduced into the polyethylene terephthalate polymers using a reactive carrier, which facilitates uniform blending within the polymer melt. Preferably, the reactive carrier is a polyol (e.g., polyethylene glycol) having a molecular weight that permits the polyol to be pumped at near ambient temperatures (e.g., less than 60° C.) and that is introduced to the polyethylene terephthalate polymers in quantities such that bulk properties of the polyethylene terephthalate polymers are not significantly affected. The polyethylene terephthalate polymers are then formed into chips (or pellets via a polymer cutter) before being solid state polymerized. Importantly, the polyol reactive carrier combines with the polyethylene terephthalate polymer such that it is non-extractable during subsequent processing operations (e.g., forming polyester preforms or beverage containers).

As will be understood by those of ordinary skill in the art, macromolecules are considered to be polymers at an intrinsic viscosity of about 0.45 dl/g. This roughly translates to a molecular weight of at least about 13,000 g/mol. In contrast, the reactive carriers according to the present invention have molecular weights that are less than about 10,000 g/mol. The molecular weight of the reactive carrier is typically less than 6000 g/mol, preferably less than 4000 g/mol, more preferably between about 300 and 2000 g/mol, and most preferably between about 400 and 1000 g/mol. As used herein, molecular weight refers to number-average molecular weight, rather than weight-average molecular weight.

FIGS. 2 and 3 illustrate the theoretical loss of intrinsic viscosity as a function of reactive carrier concentration at several molecular weights. FIG. 2 depicts the impact of the reactive carrier on upon polyethylene terephthalate having an intrinsic viscosity of 0.63 dl/g. Similarly, FIG. 3 depicts the impact of the reactive carrier on upon polyethylene terephthalate having intrinsic viscosity of 0.45 dl/g. Note that at any concentration, the reactive carriers having higher molecular weights have less adverse effect upon intrinsic viscosity of the polymer resin.

As used herein, the term "intrinsic viscosity" is the ratio of the specific viscosity of a polymer solution of known concentration to the concentration of solute, extrapolated to zero concentration. Intrinsic viscosity, which is widely recognized as standard measurements of polymer characteristics, is directly proportional to average polymer molecular weight. See, e.g., *Dictionary of Fiber and Textile Technology*, Hoechst Celanese Corporation (1990); Tortora & Merkel, *Fairchild's Dictionary of Textiles* (7$^{th}$ Edition 1996).

Intrinsic viscosity can be measured and determined without undue experimentation by those of ordinary skill in this art. For the intrinsic viscosity values described herein, the intrinsic viscosity is determined by dissolving the copolyester in orthochlorophenol (OCP), measuring the relative viscosity of the solution using a Schott Autoviscometer (AVS Schott and AVS 500 Viscosystem), and then calculating the intrinsic viscosity based on the relative viscosity. See, e.g., *Dictionary of Fiber and Textile Technology* ("intrinsic viscosity").

In particular, a 0.6-gram sample (+/–0.005 g) of dried polymer sample is dissolved in about 50 ml (61.0–63.5 grams) of orthochlorophenol at a temperature of about 105° C. Fiber and yarn samples are typically cut into small pieces, whereas chip samples are ground. After cooling to room temperature, the solution is placed in the viscometer and the relative viscosity is measured. As noted, intrinsic viscosity is calculated from relative viscosity.

Finally, as is understood by those familiar with polyester packaging, ultraviolet (UV) radiation absorbers protect polymers and the contents of packages formed from the same. Where UV absorbers are added to the bottle resin during the injection molding process, there is a tendency for such UV absorbers (and when used, reactive carriers that deliver UV absorbers) to leave deposits in the injection molds used for preforms. Such deposits cause the preforms to stick in the injection molds slightly longer, thereby slowing preform manufacturing efficiency.

Without being bound to any particular theory, it is believed that the interaction between a UV absorber and the bottle resin produces byproducts that in turn deposit on the molds in which polyester bottle preforms are manufactured. These deposits cause the preforms to stick in the mold, thereby slowing the production rate of the preform-making process. Calcium carbonate, and especially talc, have been found to have the beneficial effect of reducing adherence to preform molds, thereby increasing the speed and efficiency of the injection molding process. Accordingly, an embodiment of the polyester resin includes both an inert particulate additive as herein described and a UV absorber.

In the drawings and the specification, typical embodiments of the invention have been disclosed. Specific terms have been used only in a generic and descriptive sense, and not for purposes of limitation. The scope of the invention is set forth in the following claims.

That which is claimed is:

1. A method for making polyethylene terephthalate resin that can be formed into high-clarity bottles possessing reduced coefficient of friction, comprising:

reacting a terephthalate component and a diol component to form polyethylene terephthalate precursors;

polymerizing the polyethylene terephthalate precursors via melt phase polycondensation to form polymers of polyethylene terephthalate; and thereafter introducing into the polyethylene terephthalate polymers a reactive carrier having a molecular weight of less than about 10,000 g/mol, the reactive carrier being the delivery vehicle for between about 20 and 200 ppm of an inert particulate additive that is capable of reducing the coefficient of friction in bottles formed from the polyethylene terephthalate polymers;

wherein the inert particulate additive is selected from the group consisting of talc and calcium carbonate; and wherein the inert particulate additive has an average particle size of less than about ten microns.

2. A method for making polyethylene terephthalate resin according to claim 1, wherein the step of introducing an inert particulate additive into the polyethylene terephthalate polymers via a reactive carrier comprises introducing between about 40 and 150 ppm of the inert particulate additive.

3. A method for making polyethylene terephthalate resin according to claim 1, wherein the step of introducing an inert particulate additive into the polyethylene terephthalate polymers via a reactive carrier comprises introducing between about 60 and 100 ppm of the inert particulate additive.

4. A method for making polyethylene terephthalate resin according to claim 1, wherein the step of introducing an inert particulate additive into the polyethylene terephthalate polymers via a reactive carrier comprises introducing an inert particulate additive having an average particle size of less than about two microns.

5. A method for making polyethylene terephthalate resin according to claim 1, wherein the step of introducing an inert particulate additive into the polyethylene terephthalate polymers via a reactive carrier comprises introducing talc.

6. A method for making polyethylene terephthalate resin according to claim 1, wherein the step of introducing an inert particulate additive into the polyethylene terephthalate polymers via a reactive carrier comprises introducing calcium carbonate.

7. A method according to claim 1, wherein the step of reacting a terephthalate component and a diol component comprises:

reacting terephthalic acid and ethylene glycol in a heated esterification reaction to form monomers and oligomers of terephthalic acid and ethylene glycol, as well as water, and removing water as it is formed during the esterification reaction to enable the esterification reaction to go essentially to completion.

8. A method according to claim 1, wherein the step of reacting a terephthalate component and a dial component comprises:

reacting dimethyl terephthalate and ethylene glycol in a heated ester exchange reaction to form monomers and oligomers of terephthalate and ethylene glycol, as well as methanol; and removing methanol as it is formed during the ester exchange reaction to enable the ester exchange reaction to go essentially to completion.

9. A method according to claim 1, further comprising:

forming the polyethylene terephthalate polymers into pellets; and solid state polymerizing the polyethylene terephthalate polymers.

10. A method according to claim 1, further comprising forming the polyethylene terephthalate polymers into preforms.

11. A method according to claim 10, further comprising forming the preforms into containers.

12. A method according to claim 1, wherein the step of introducing a reactive carrier into the polyethylene terephthalate polymers comprises injecting a reactive carrier that is a liquid or slurry at near ambient temperatures.

13. A method according to claim 1, wherein the reactive carrier is introduced to the polyethylene terephthalate polymers in quantities such that its concentration in the polymers is less than about 1000 ppm.

14. A method according to claim 1, wherein the reactive carrier comprises a polyol having a molecular weight that is sufficiently high such that the polyol will not substantially reduce the intrinsic viscosity of the polyethylene terephthalate polymer, and a viscosity that facilitates pumping of the polyol.

15. A method according to claim 1, further comprising the step of introducing a UV absorber that is capable of protecting the contents of packages formed from the polyethylene terephthalate polymers.

16. A method for making polyethylene terephthalate resin that can be formed into high-clarity bottles possessing reduced coefficient of friction, comprising:
   reacting terephthalic acid and ethylene glycol in a heated esterification reaction to form monomers and oligomers of terephthalic acid and ethylene glycol;
   polymerizing the monomers and oligomers via melt phase polycondensation to form polymers of polyethylene terephthalate;
   thereafter introducing via a reactive carrier between about 20 and 200 ppm of an inert additive selected from the group consisting of surface-modified talc and surface-modified calcium carbonate, wherein the reactive carrier is a polyol having a molecular weight that permits the polyol to be pumped at near ambient temperatures and wherein the reactive carrier is introduced to the polyethylene terephthalate polymers in quantities such that bulk properties of the polyethylene terephthalate polymers are not significantly affected;
   forming the polyethylene terephthalate polymers into pellets; and
   solid state polymerizing the polyethylene terephthalate polymers.

17. A method for making polyethylene terephthalate resin according to claim 16, wherein the step of introducing an inert additive comprises introducing between about 40 and 150 ppm of the inert additive.

18. A method for making polyethylene terephthalate resin according to claim 16, wherein the step of introducing an inert additive comprises introducing between about 60 and 100 ppm at the inert additive.

19. A method for making polyethylene terephthalate resin according to claim 16, wherein the step of introducing an inert particulate additive comprises introducing an inert particulate additive having an average particle size of less than about two microns.

20. A method for making polyethylene terephthalate resin according to claim 16, wherein the reactive carrier is introduced to the polyethylene terephthalate polymers in quantities such that its concentration in the polymers is less than about 1000 ppm.

21. A method according to claim 16, wherein the polyol reactive carrier has a molecular weight of less than about 6000 g/mol.

22. A method according to claim 16, wherein the polyol reactive carrier has a molecular weight of less than about 4000 g/mol.

23. A method according to claim 16, wherein the polyol reactive carrier has a molecular weight between about 300 and 2000 g/mol.

24. A method for making polyethylene terephthalate resin that can be formed into high-clarity bottles possessing reduced coefficient of friction, comprising:
   introducing into polyethylene terephthalate polymers, after melt phase polycondensation, between about 20 and 200 ppm of an inert particulate additive having an average particle size of less than about ten microns;
   wherein the inert particulate additive is talc or calcium carbonate; and
   wherein the inert particulate additive is introduced into the polyethylene terephthalate polymers via a reactive carrier having a molecular weight of between about 300 and 10,000 g/mol.

25. A method for making polyethylene terephthalate resin according to claim 24, wherein the step of introducing an inert particulate additive comprises introducing between about 40 and 150 ppm of the inert particulate additive.

26. A method for making polyethylene terephthalate resin according to claim 24, wherein the step of introducing an inert particulate additive comprises introducing between about 60 and 100 ppm of the inert particulate additive.

27. A method for making polyethylene terephthalate resin according to claim 24, wherein the step of introducing an inert particulate additive comprises introducing an inert particulate additive having an average particle size of less than about two microns.

28. A method for making polyethylene terephthalate resin according to claim 24, wherein the step of introducing an inert particulate additive comprises introducing surface-modified talc.

29. A method for making polyethylene terephthalate resin according to claim 24, wherein the step of introducing an inert particulate additive comprises introducing surface-modified calcium carbonate.

30. A method according to claim 24, further comprising:
   forming the polyethylene terephthalate polymers into pellets; and
   solid state polymerizing the polyethylene terephthalate polymers.

31. A method according to claim 24, further comprising forming the polyethylene terephthalate polymers into preform.

32. A method according to claim 31, further comprising forming the preforms into containers.

33. A method according to claim 32, wherein the step of forming the preforms into containers comprises forming the preforms into high-clarity beverage bottles possessing reduced coefficient of friction.

34. A method according to claim 24, wherein the reactive carrier is a liquid or slurry at near ambient temperatures.

35. A method according to claim 24, wherein the reactive carrier is introduced to the polyethylene terephthalate polymers in quantities such that bulk polymer properties are not significantly affected.

36. A method according to claim 24, wherein the reactive carrier is introduced to the polyethylene terephthalate polymers in quantities such that its concentration in the polymers is less than about 1000 ppm.

37. A method according to claim 24, wherein the molecular weight of the reactive carrier is less than about 6000 g/mol.

38. A method according to claim 24, wherein the molecular weight of the reactive carrier is less than about 2000 g/mol.

39. A method according to claim 24, wherein the reactive carrier comprises a polyol having a molecular weight that is sufficiently high such that the polyol will not substantially reduce the intrinsic viscosity of the polyethylene terephthalate polymer, and a viscosity that facilitates pumping of the polyol.

40. A method according to claim 24, further comprising the step of introducing a UV absorber that is capable of protecting the contents of packages formed from the polyethylene terephthalate polymers.

41. A method according to claim 1, wherein the molecular weight of the reactive carrier is between about 400 and 1000 g/mol.

42. A method for making polyethylene terephthalate resin according to claim 1, wherein the step of introducing an inert particulate additive into the polyethylene terephthalate polymers via a reactive carrier comprises introducing between 20 and 200 ppm of talc having an average particle size of less than about two microns.

43. A method for making polyethylene terephthalate resin according to claim 1, wherein the step of introducing an inert particulate additive into the polyethylene terephthalate polymers via a reactive carrier comprises introducing between about 40 and 100 ppm of talc.

44. A method for making polyethylene terephthalate resin according to claim 1, wherein the step of introducing an inert particulate additive into the polyethylene terephthalate polymers via a reactive carrier comprises introducing between 60 and 100 ppm of surface-modified talc.

45. A method for making polyethylene terephthalate resin according to claim 16, wherein the step of introducing an inert additive comprises introducing between 40 and 150 ppm of surface-modified talc having an average particle size of lean than two microns.

46. A method for making polyethylene terephthalate resin according to claim 16, wherein the step of introducing an inert additive comprises introducing between 40 and 100 ppm of surface-modified talc.

47. A method according to claim 24, wherein the step of introducing an inert particulate additive comprises introducing between about 40 and 150 ppm of talc.

48. A method according to claim 24, wherein the step of introducing an inert particulate additive comprises introducing between 40 and 100 ppm of talc having an average particle size of less than about two microns.

49. A method according to claim 24, wherein the step of introducing an inert particulate additive comprises introducing between about 60 and 100 ppm of talc.

50. A method according to claim 24, wherein the step of introducing an inert particulate additive comprises introducing between about 60 and 100 ppm of surface-modified talc.

51. A method according to claim 24, wherein:

the inert additive is talc; and the reactive carrier is introduced to the polyethylene terephthalate polymers in quantities such that its concentration in the polymers is less than about one weight percent.

52. A method according to claim 24, wherein the reactive carrier possesses carboxyl, hydroxyl, or amine functional groups.

* * * * *

UNITED STATES PATENT AND TRADEMARK OFFICE
CERTIFICATE OF CORRECTION

PATENT NO. : 6,710,158 B2
DATED : March 23, 2004
INVENTOR(S) : Edwards et al.

It is certified that error appears in the above-identified patent and that said Letters Patent is hereby corrected as shown below:

Title page,
Item [56], References Cited, FOREIGN PATENT DOCUMENTS, "JP 4183718" reference, "8/1992" should read -- 6/1992 --
"JP 6065478" reference, "8/1994" should read -- 3/1994 --

Column 10,
Line 53, "dial" should read -- diol --

Column 11,
Line 54, "at" should read -- of --

Column 14,
Line 3, "lean" should read -- less --

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,710,158 B2
APPLICATION NO. : 10/177932
DATED : March 23, 2004
INVENTOR(S) : Edwards et al.

It is certified that error appears in the above-identified patent and that said Letters Patent is hereby corrected as shown below:

Title page:

Item [75], Inventors, please add "Sharon Sue Griffith, Charlotte, NC (US)"

Signed and Sealed this

Eighteenth Day of July, 2006

JON W. DUDAS
*Director of the United States Patent and Trademark Office*